United States Patent [19]
Uchida et al.

[11] Patent Number: 6,104,110
[45] Date of Patent: Aug. 15, 2000

[54] ELECTRICAL NOISE SUPPRESSOR FOR DIRECT CURRENT MOTOR

[75] Inventors: Yasuaki Uchida, Kosai; Yasushi Sugahara, Toyohashi; Tsugio Ozaki, Hamana-gun; Yoshihiko Harada, Hamamatsu, all of Japan

[73] Assignee: IPICS Corporation, Japan

[21] Appl. No.: 09/291,140

[22] Filed: Apr. 12, 1999

[30] Foreign Application Priority Data

| | | | |
|---|---|---|---|
| Jun. 5, 1998 | [JP] | Japan | 10-157677 |
| Nov. 9, 1998 | [JP] | Japan | 10-317604 |

[51] Int. Cl.$^7$ .................................................. H02K 5/24
[52] U.S. Cl. ............................... 310/51; 310/71; 310/239
[58] Field of Search ............................... 310/51, 239, 71, 310/68 R, 40 MM

[56] References Cited

U.S. PATENT DOCUMENTS

| | | | |
|---|---|---|---|
| 4,340,831 | 7/1982 | Kuhlmann et al. | 310/239 |
| 4,342,934 | 8/1982 | Van Wijhe et al. | 310/239 |
| 4,550,268 | 10/1985 | Becker et al. | 310/239 |
| 4,748,356 | 5/1988 | Okashiro et al. | 310/72 |
| 5,221,130 | 6/1993 | Satoh et al. | 310/239 |
| 5,231,321 | 7/1993 | Takiguchi | 310/51 |
| 5,243,247 | 9/1993 | Schmidt | 310/239 |
| 5,453,646 | 9/1995 | Gleixner et al. | 310/51 |
| 5,942,819 | 8/1999 | Burgess et al. | 310/51 |

FOREIGN PATENT DOCUMENTS 4-501650 of 1993 Japan.

*Primary Examiner*—Nestor Ramirez
*Assistant Examiner*—Joseph Waks
*Attorney, Agent, or Firm*—Fish & Richardson P.C.

[57] ABSTRACT

An electric noise suppressor for a direct current motor comprises a grommet, a choke coil and an electrical terminal. The grommet has an accommodating portion for accommodating the choke coil, an engaging portion for being engaged with a brush holding board of the motor, and a holding portion for holding the terminal. A pair of supporting portions for supporting a pigtail connector are formed to symmetrically protrude from an upper peripheral portion of the accommodating portion. Therefore, the terminal and the pigtail connector are disposed outside the accommodating portion of the grommet, thereby enabling inductance of the choke coil to increase. Further, the pigtail connector, the choke coil and the terminal are restricted from moving and chattering. As a result, the electrical noise suppressor requires less mounting space and is highly reliable.

14 Claims, 10 Drawing Sheets

ELECTRICAL NOISE SUPPRESSOR FOR DIRECT CURRENT MOTOR

CROSS REFERENCE TO RELATED APPLICATION

This application relates to and incorporates herein by reference Japanese Patent Application Nos. 10-157677 filed on Jun. 5, 1998, and 10-317604 filed on Nov. 9, 1998.

BACKGROUND OF THE INVENTION

1. Field of the Invention:

The present invention relates to an electrical noise suppressor for suppressing electrical noise generated by a direct current motor.

2. Related Art:

Conventionally, a wiper driving device for driving a wiper of a vehicle comprises a motor unit and a gear unit. A worm gear attached to a rotation shaft of a motor of the motor unit is engaged with a gear wheel in the gear unit to rotate the gear wheel therewith. Further, the rotation shaft is connected with a crank arm for driving the wiper so that rotation of the motor is transmitted to the crank arm, thereby driving the wiper.

In the wiper driving device, the motor is a direct current type (DC motor) which has brushes and an armature. The brushes are connected to an external power source through electrical terminals. When the brushes make contact with a commutator of the armature, the DC motor is supplied with power. However, when the motor operates, the brushes sliding on the commutator generate electrical noise. Therefore, the DC motor has an electrical noise suppressor for restricting electrical noise from being transmitted to the external power source through the terminals.

Figure 14:
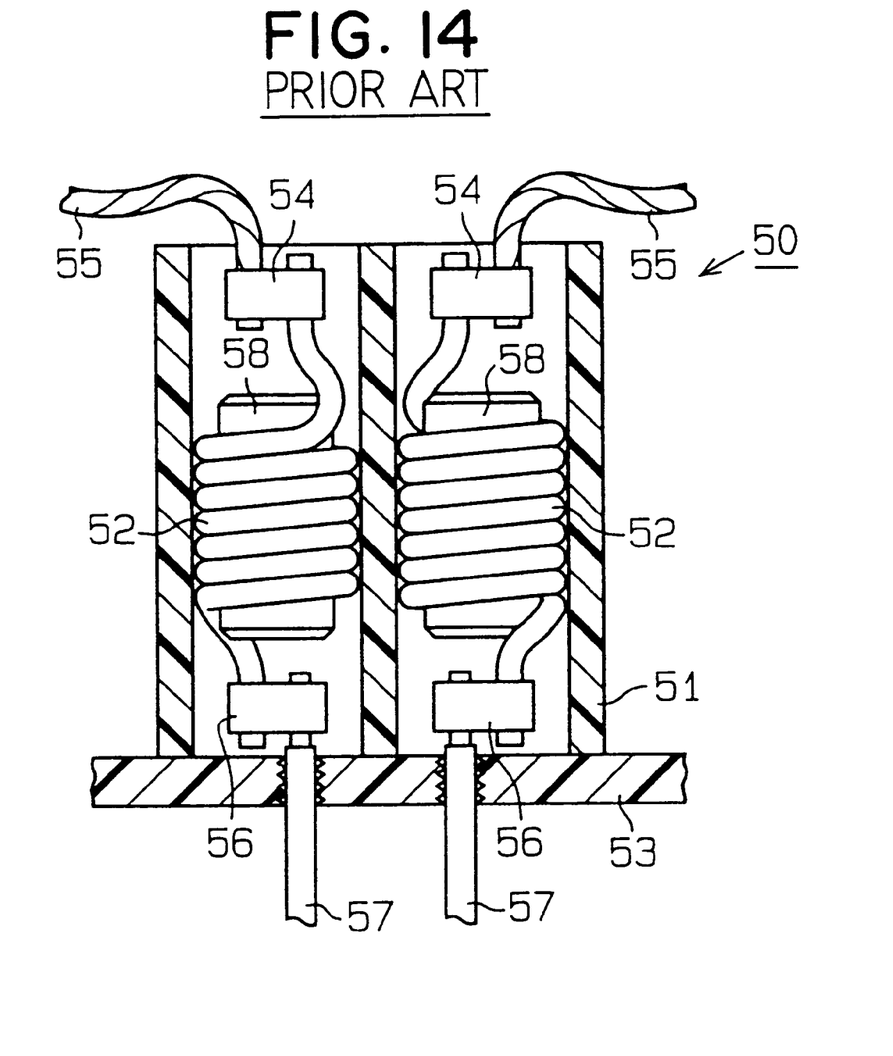
FIG. 14 is a cross-sectional view showing a conventional electrical noise suppressor for a direct current motor.

As shown in FIG. 14, an electrical noise suppressor 50 for a DC motor is disposed in a brush holder 51 for holding brushes (not shown) of the DC motor. The electrical noise suppressor 50 has, for each brush, a choke coil 52 wound around a core 58 and a grommet 53 in which the choke coil 52 is accommodated. One end of the choke coil 52 is connected to the brush through an electrical connector 54 and a pigtail 55 connected to the brush. The other end of the choke coil 52 is connected to an external power source (not shown) through an electrical connector 56 and an electrical terminal 57. Thus, the choke coil 52 is connected between the brush and the terminal 57. Electrical noise generated by the brush is damped by the choke coil 52.

However, the choke coil 52 is disposed in the grommet 53 in such a manner that the choke coil 52 hangs in the air. Therefore, positions of the choke coil 52 and the connectors 54, 56 tend to greatly vary. As a result, chattering of the choke coil 52 may occur due to vibration caused by operation of the motor. To overcome this problem, an opening between the pigtail 55 and a motor yoke (not shown) of the motor, windings or a commutator of an armature of the motor is increased so that the pigtail 55 does not make contact with the motor yoke, the windings and the commutator of the armature during operation of the motor. However, in this case, a usable space within the motor is decreased. Further, due to this space limitation, it is difficult to increase inductance of the choke coil 52.

Further, in the electrical noise suppressor 50, the choke coil 52 tends to loosen and the core 58 of the choke coil 52 tends to come off due to vibration caused by operation of the motor. As a result, noise suppressing performance of the electrical noise suppressor 50 may be lessened.

Furthermore, since assembly efficiency for attaching the choke coil 52 and the connector 56 to the grommet 53 is poor, the choke coil 52 and the connector 56 may be bent during assembly.

SUMMARY OF THE INVENTION

In view of the foregoing problems, it is an object of the present invention to provide an electrical noise suppressor which requires less mounting space and suppresses electrical noise with high reliability.

According to the present invention, an electrical noise suppressor for a DC motor has an electrical terminal, a choke coil and a grommet having an accommodating portion for accommodating the choke coil. The terminal is connected to an external power source for supplying power to a brush of the motor. One end of the choke coil is connected to the brush through a pigtail and the other end of the choke coil is connected to the terminal. The pigtail is connected to the choke coil through a pigtail connector. The pigtail connector and the terminal are disposed outside the accommodating portion of the grommet. Therefore, a space inside the accommodating portion of the grommet is increased, thereby enabling inductance of the choke coil to be increased.

Preferably, the pigtail connector is supported by a supporting portion formed at an outer peripheral portion of the accommodating portion. Therefore, the pigtail connector is restricted from moving, and positions of the choke coil and the pigtail connector are restricted from greatly varying. As a result, the pigtail is restricted from making contact with a motor yoke or windings and a commutator of an armature of the motor, and the choke coil is restricted from loosening. Therefore, the electrical noise connector requires less mounting space and is highly reliable.

More preferably, the accommodating portion has a choke coil insertion hole made of a first hole and a second hole which lap over with each other. A diameter of the first hole is larger than that of the second hole. Therefore, two kinds of the choke coils having different diameters can be mounted on the single grommet, thereby readily providing two kinds of the electric noise suppressors.

BRIEF DESCRIPTION OF THE DRAWINGS

This and other objects and features of the present invention will become more readily apparent from a better understanding of the preferred embodiments described below with reference to the accompanying drawings. In the drawings.

DETAILED DESCRIPTION OF THE PREFERRED EMBODIMENTS

Preferred embodiments of the present invention are described hereinafter with reference to the accompanying drawings. Those embodiments of the present invention may be applied to a wiper driving motor for driving a wiper of a vehicle.

(First Embodiment)

Figure 1:
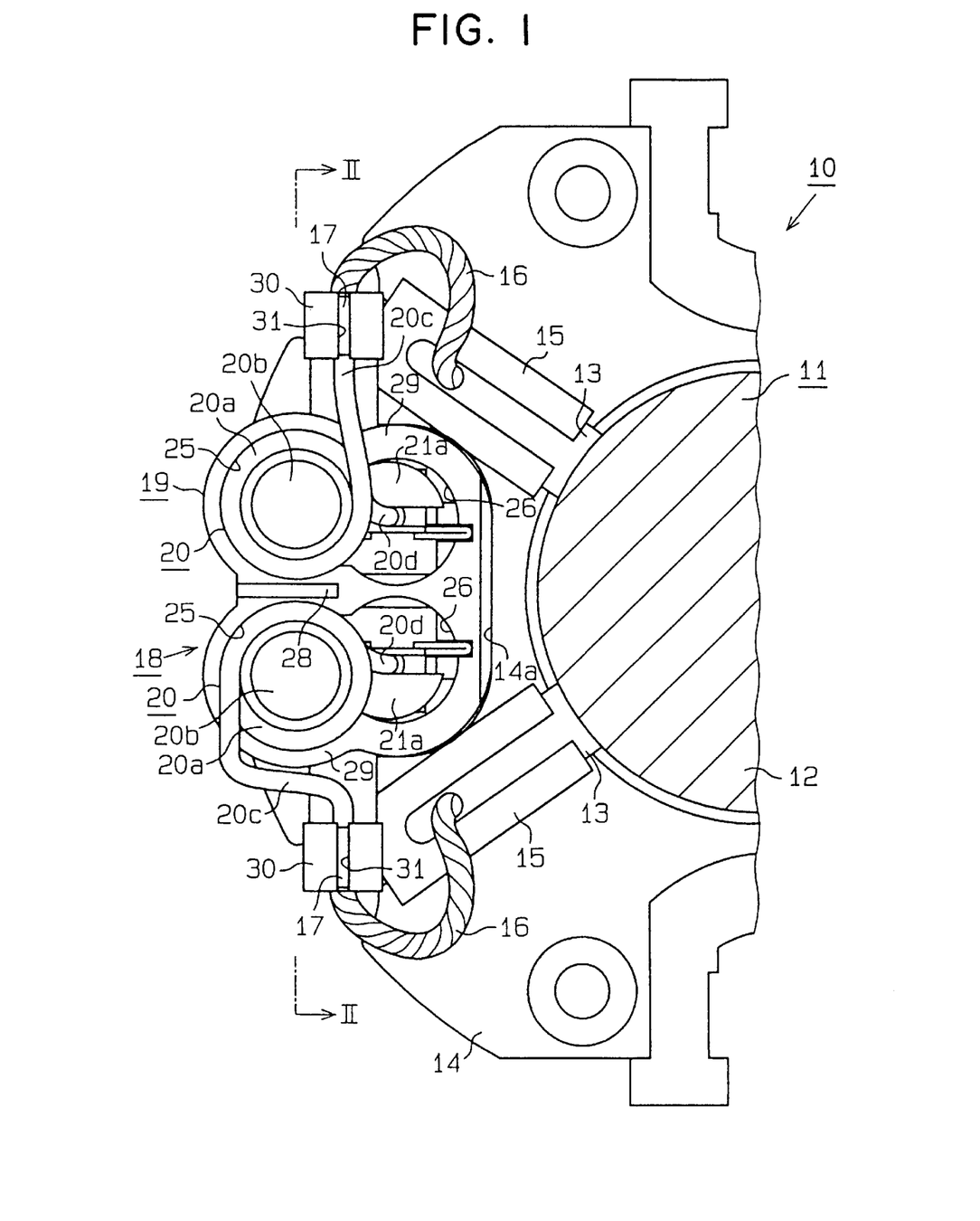
FIG. 1 is a schematic partial top view showing a direct current motor using an electrical noise suppressor according to a first preferred embodiment of the present invention.
Figure 2:
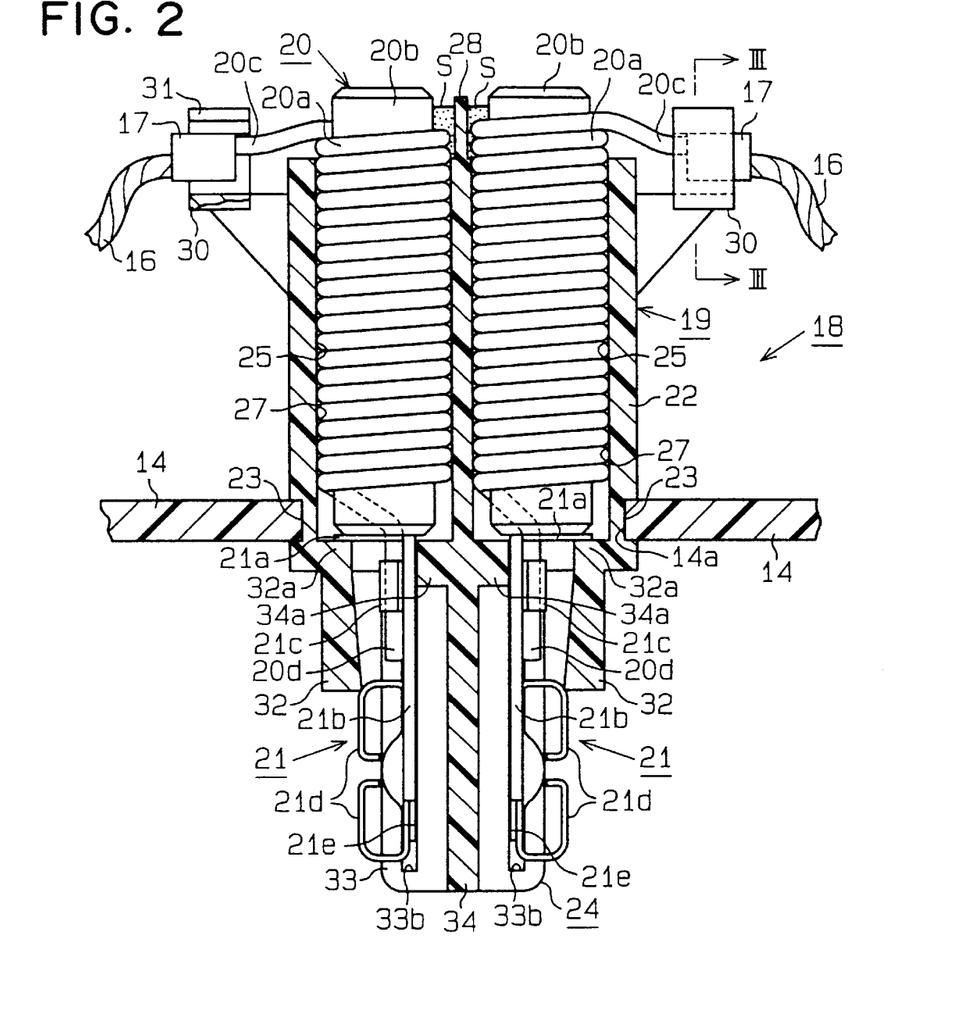
FIG. 2 is a cross-sectional view taken along line II—II in FIG. 1.

A first preferred embodiment of the present invention is shown in FIGS. 1–4. As shown in FIG. 1, each of brushes 13 of a DC motor 10 for making contact with a commutator 12 of an armature 11 of the motor 10 is inserted into a brush guiding portion 15. Each of the brush guiding portions 15 is bonded to a brush holding board 14 of the motor 10. The brush 13 is connected with one end of a pigtail 16. The other end of the pigtail 16 is connected with an electrical noise suppressor 18 through a pigtail connector 17, as shown in FIG. 2.

The noise suppressor 18 comprises a grommet 19 made of synthetic resin, a choke coil 20 accommodated within the grommet 19 and an electrical terminal 21. As shown in FIGS. 1–4, the grommet 19 has an accommodating portion 22 for accommodating the choke coil 20, an engaging portion 23 for engaging with an engaging recessed portion 14a formed in the brush holding board 14, and a holding portion 24 for holding the terminal 24.

Figure 4:
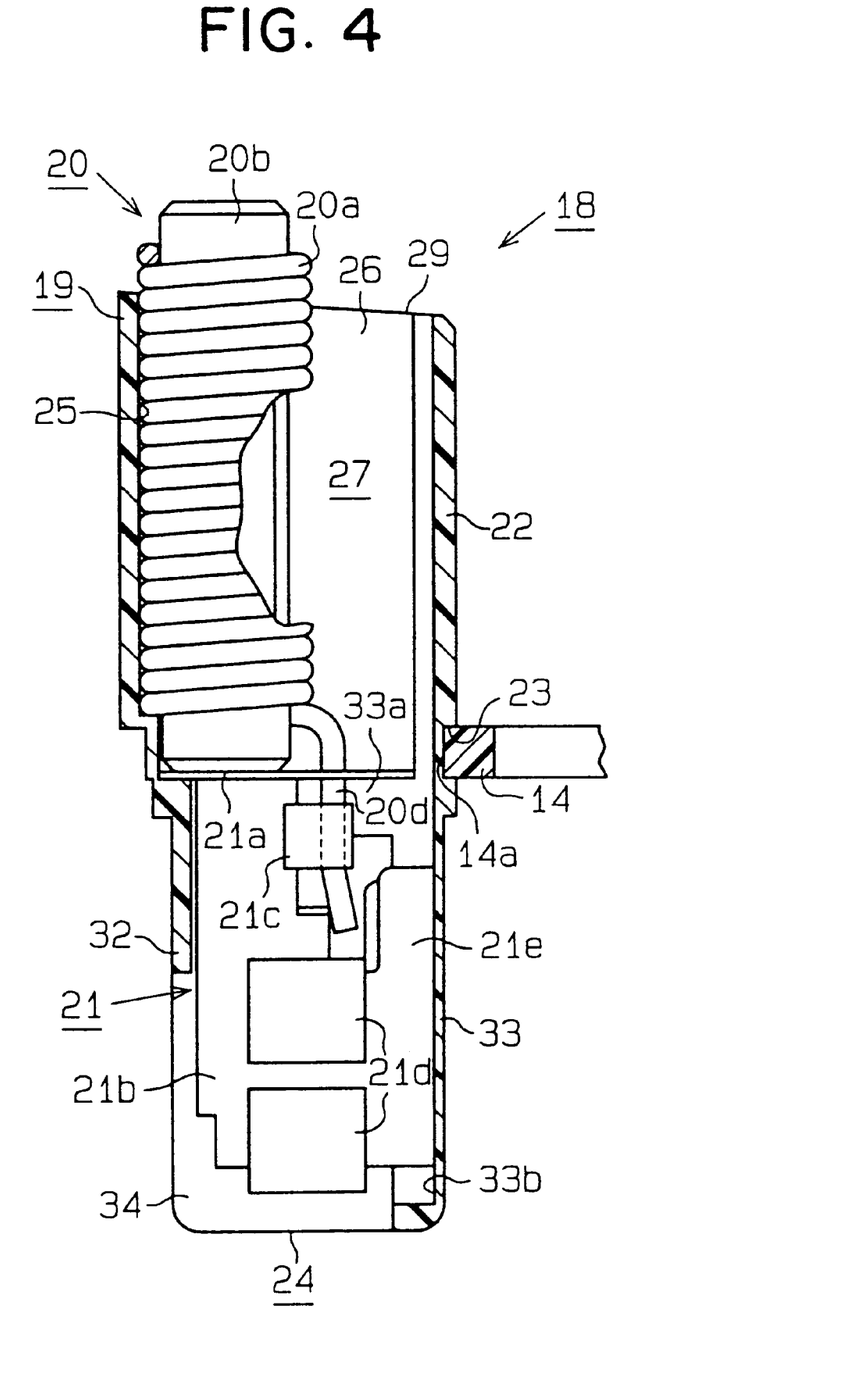
FIG. 4 is a cross-sectional view showing the electrical noise suppressor according to the first embodiment.

The accommodating portion 22 has a pair of choke coil insertion holes 27 formed through partition by a partition wall 28 to be symmetrical with respect to the partition wall 28. Each of the choke coil insertion holes 27 is made of a large diameter hole 25 and a small diameter hole 26. The large diameter hole 25 and the small diameter hole 26 partially lap over with each other. The choke coil 20 inserted in one of the choke coil insertion holes 27 does not make contact with the choke coil 20 inserted in the other choke coil insertion hole 27 due to the partition wall 28. Further, as shown in FIG. 4, an upper end surface 29 of the accommodating portion 22 is formed inclined from one end of the large diameter hole 25 toward an opposite end of the small diameter hole 26.

Figure 3:
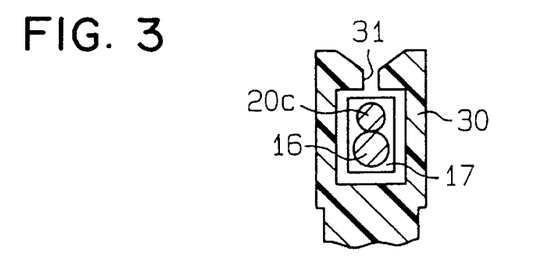
FIG. 3 is a cross-sectional view taken along line III—III in FIG. 2.

Further, as shown in FIGS. 1, 2, a pair of supporting portions 30 for supporting the pigtail connector 17 are formed to protrude from an upper peripheral portion of the accommodating portion 22. The supporting portions 30 are symmetrical with respect to the accommodating portion 22. Further, as shown in FIG. 3, the supporting portion 30 is formed to have a structure similar to that of a well known resilient wiring fastener for fastening electric wiring. That is, the supporting portion 30 has an opening 31 and is formed so that the pigtail connector 17 is readily inserted into the supporting portion 30 and hardly detached from the supporting portion 30 through the opening 31.

The engaging portion 23 is formed to be recessed on an outer peripheral surface of a bottom end of the accommodating portion 22. The engaging portion 23 is engaged with the engaging recessed portion 14a of the brush holding board 14, thereby attaching the grommet 19 to the brush holding board 14. The holding portion 24 is formed below the engaging portion 23.

As shown in FIGS, 2, 4, the holding portion 24 has a positioning portion 32, a flat plate portion 33 and a separator 34. The positioning portion 32 is formed to extend from the engaging portion 23 downwardly. The flat plate portion 33 is formed to face the positioning portion 32 and to extend from the engaging portion 23 downwardly so that the flat plate portion 33 is parallel with an axis of the accommodating portion 22. The separator 34 is formed to protrude from a center portion of the flat plate portion 33 to be perpendicular to the flat plate portion 33.

A supporting stand portion 32a is formed at a base end of the positioning portion 32. Further, an inner surface of the positioning portion 32 is formed inclined, so that thickness of the positioning portion 32 in a direction perpendicular to an insertion direction of the choke coil 20 is increased from the base end to a top end of the positioning portion 32.

As shown in FIG. 4, a supporting stand portion 33a is also formed at a base end of the flat plate portion 33. Further, an engaging groove 33b is also formed in the flat plate portion 33 to extend from the base end toward a top end of the flat plate portion 33.

As shown in FIGS. 2, 4, the choke coil 20 has a coil 20a made of conductive material and a core 20b on which the coil 20a is wound. The terminal 21 consists of a plate 21a and a connecting portion 21b. The connecting portion 21b includes a coil fastener 21c, a connection terminal 21d and a grommet engaging portion 21e.

As shown in FIGS. 2, 4, the plate 21a of the terminal 21 is supported by the supporting stand portions 32a, 33a, thereby restricting the terminal 21 from moving downwardly. Further, the terminal 21 is restricted from making contact with the other terminal 21 by the separator 34a. The grommet engaging portion 21e is engaged with the engaging groove 33b. The connection terminal 21d makes contact with a lower end of the positioning portion 32. As a result, the terminal 21 is restricted from moving and chattering. Furthermore, the plate 21a is pressed by the core 20b from above, thereby restricting the terminal 21 from moving upwardly.

The choke coil 20 is inserted into the large diameter hole 25 of the choke coil insertion hole 27 in such a manner that the core 20b of the choke coil 20 makes contact with the plate 21a. Therefore, the choke coil 20 is restricted from chattering and moving downwardly. One end 20c of the coil 20a of the choke coil 20 is connected with the pigtail 16 through the pigtail connector 17 supported by the supporting portion 30. Further, the coil 20a, the core 20b and the partition wall 28 of the grommet 19 are integrally bonded together using adhesive S. The other end 20d of the coil 20a is fastened by the coil fastener 21c of the terminal 21 to be connected with the terminal 21. As a result, the choke coil 20 is also restricted from moving upwardly.

According to the first embodiment, the pigtail connector 17 and the terminal 21 are disposed outside the accommodating portion 22 of the grommet 19. Therefore, a number of windings of the choke coil 20 disposed in the accommodating portion 22 can be increased, thereby enabling inductance of the choke coil 20 to be increased.

Further, the pigtail connector 17 is supported by the supporting portion 30 of the grommet 19. Therefore, positions of the choke coil 20 and the pigtail connector 17 are restricted from greatly varying, and the pigtail connector 17 is restricted from moving due to vibration caused by operation of the motor 10. As a result, the pigtail 16 is restricted from making contact with the motor yoke, the windings and commutator of the armature. Further, since the pigtail connector 17 is restricted from moving, chattering of the choke coil 20 and the pigtail connector 17 due to vibration is restricted. As a result, the choke coil 20 is restricted from loosening, thereby improving reliability of the noise suppressor 18.

Further, in the first embodiment, the accommodating portion 22 of the grommet 19 has a pair of the choke coil insertion holes 27 formed by the partition wall 28 to be symmetrical with respect to the partition wall 28. The choke coil insertion hole 27 is made of the large diameter hole 25 and the small diameter hole 26. Therefore, two kinds of the choke coils 20 having a different diameter can be mounted on the single grommet 19. As a result, two kinds of the noise suppressors 18 are readily provided by switching between the two kinds of the choke coils 20. Thus, it is not necessary to produce two kinds of the noise suppressors 18 separately, thereby decreasing production cost of the noise suppressor 18.

In the first embodiment, while the core 20b of the choke coil 20 makes contact with the plate 21a of the terminal 21, the other end 20d of the coil 20a is fastened by the coil fastener 21c. Further, the plate 21a is supported by the supporting stand portions 32a, 33a. Therefore, the choke coil 20 and the terminal 21 are restricted from moving and chattering due to vibration. As a result, the choke coil 20 is restricted from loosening, thereby improving reliability of the noise suppressor 18.

Further, in the first embodiment, while the one end of the core 20b makes contact with the plate 21a of the terminal 21, the other end of the core 20b is bonded to the coil 20a and the partition wall 28 through adhesive S. Therefore, the core 20b can not move upwardly or downwardly, thereby restricting the core 20b from coming off due to vibration caused by operation of the motor 10. As a result, reliability of the noise suppressor 18 is improved.

(Second Embodiment)

Figure 5:
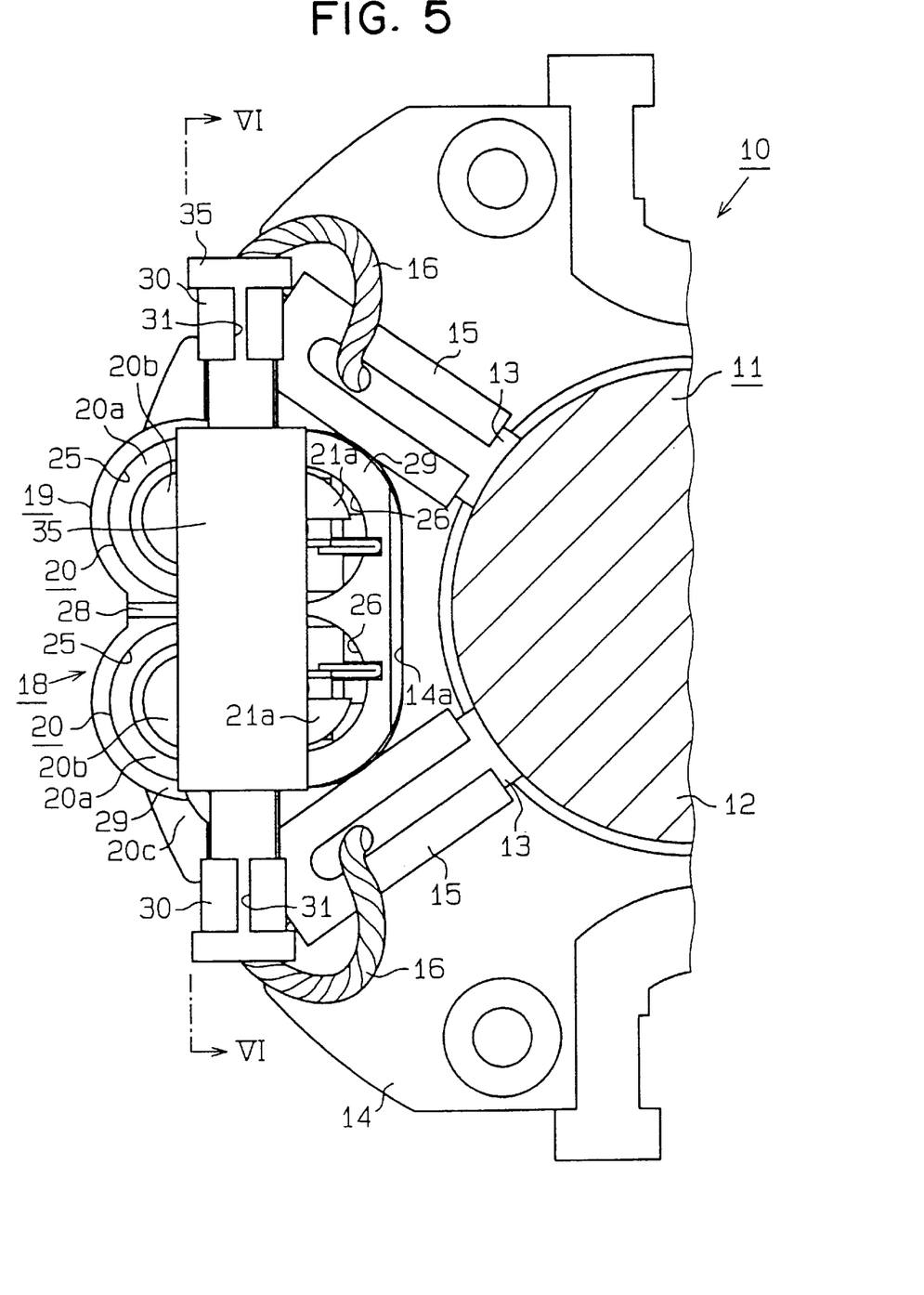
FIG. 5 is a schematic partial top view showing a direct current motor using an electrical noise suppressor according to a second preferred embodiment of the present invention.
Figure 6:
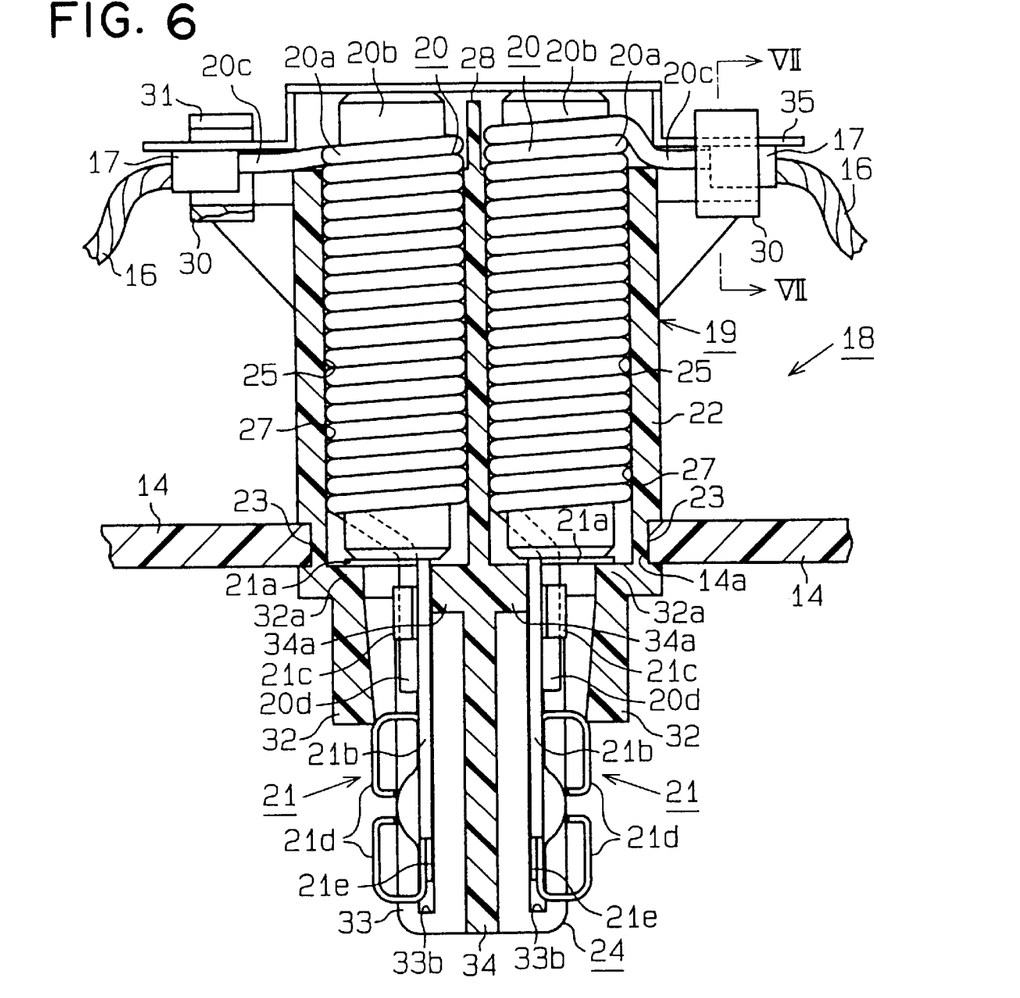
FIG. 6 is a cross-sectional view taken along line VI—VI in FIG. 5.
Figure 7:
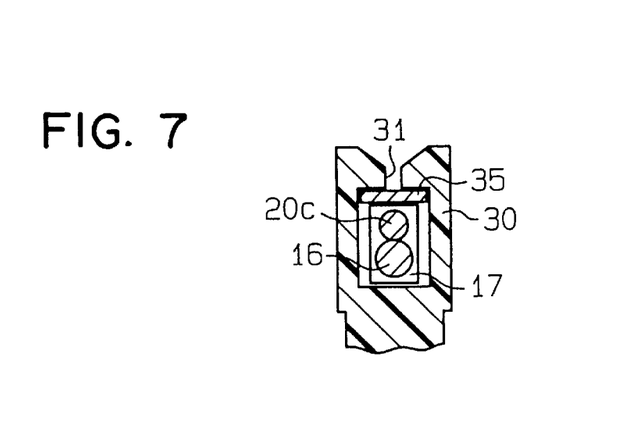
FIG. 7 is a cross-sectional view taken along line VII—VII in FIG. 6.

A second preferred embodiment of the present invention is shown in FIGS. 5–7. In this embodiment, a plate 35 is disposed so that the plate 35 makes contact with a top end surface of the core 20b. Each end of the plate 35 is inserted into the supporting portion 30 to be secured therein through the opening 31. The core 20b is pressed by the plate 35 from above, thereby restricting the core 20b from coming off due to vibration caused by operation of the motor 10. Thus, in the second embodiment, the core 20b is restricted from coming off without adhesive S, thereby improving reliability of the noise suppressor 18.

(Third Embodiment)

Figure 8:
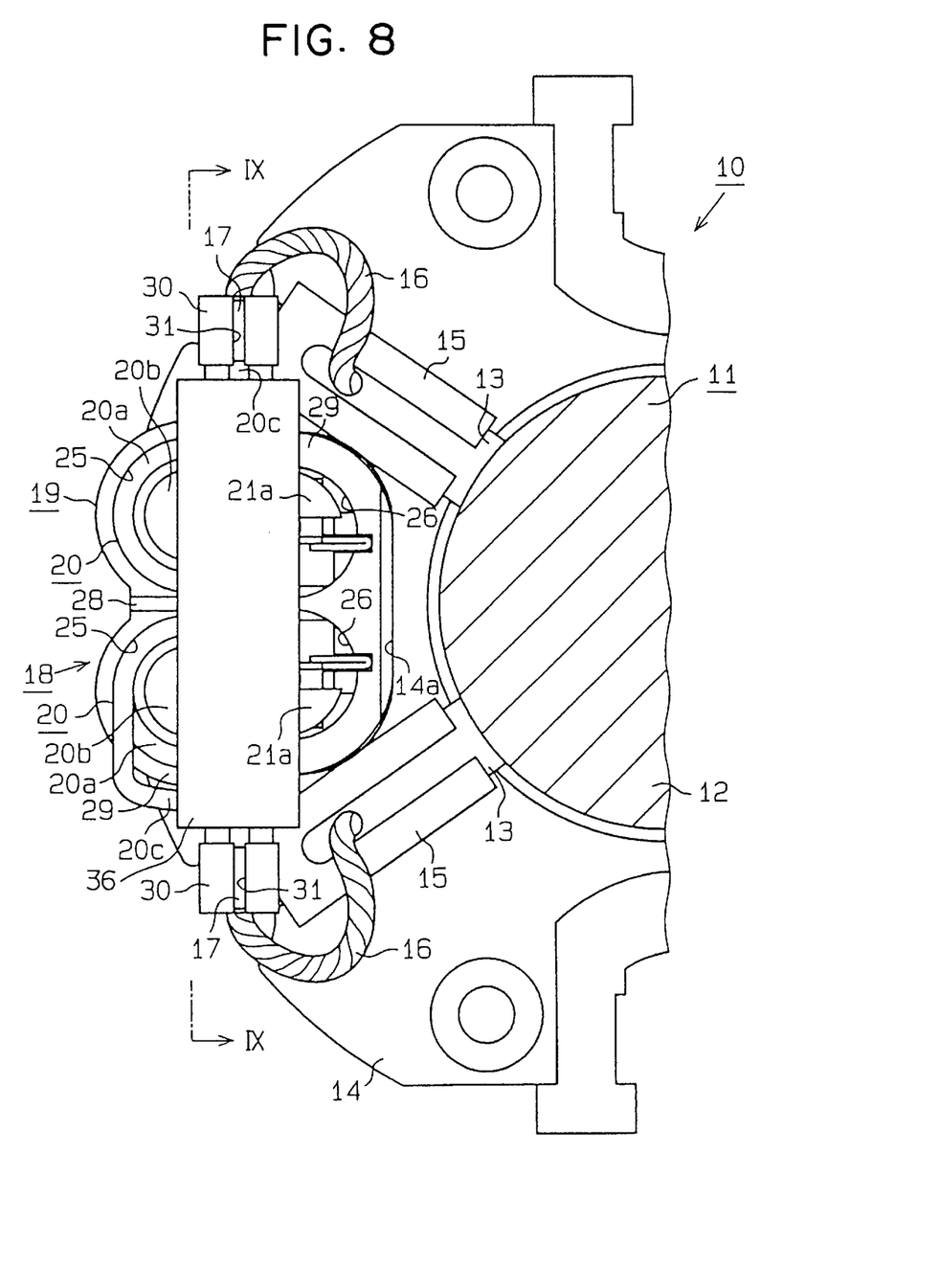
FIG. 8 is a schematic partial top view showing a direct current motor using an electrical noise suppressor according to a third preferred embodiment of the present invention.
Figure 9:
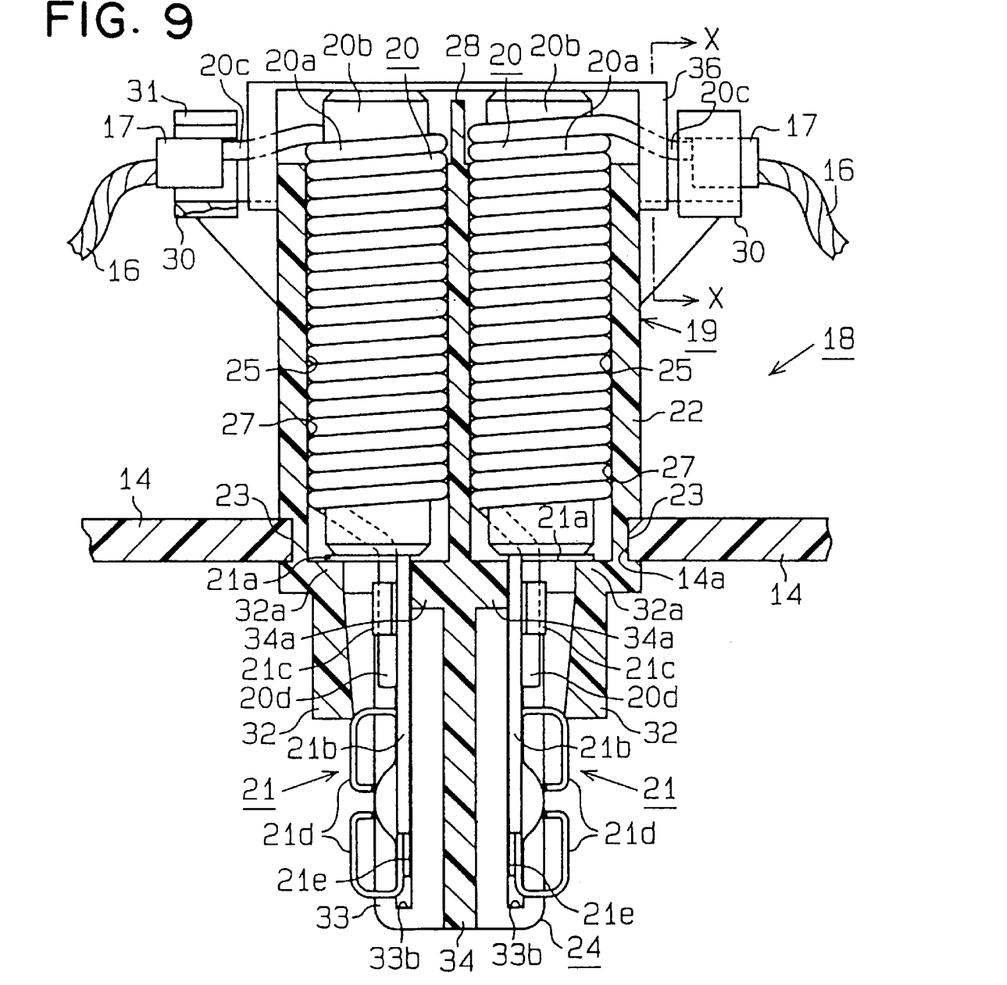
FIG. 9 is a cross-sectional view taken along line IX—IX in FIG. 8.
Figure 10:
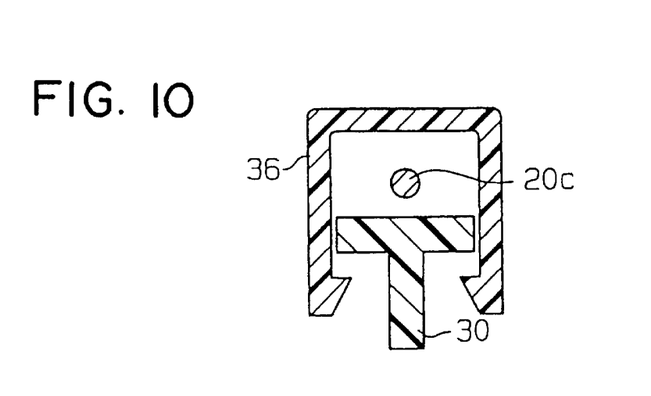
FIG. 10 is a cross-sectional view taken along line X—X in FIG. 9.

A third preferred embodiment of the present invention is shown in FIGS. 8–10. In this embodiment, a plate 36 is disposed so that the plate 36 makes contact with a top end surface of the core 20b. Each end of the plate 36 is engaged with an arm portion of the supporting portion 30. Therefore, the core 20b is pressed by the plate 36 from above, thereby restricting the core 20b from coming off due to vibration caused by operation of the motor 10. Thus, in the third embodiment, similarly to the second embodiment, the core 20b is restricted from coming off without adhesive S, thereby improving reliability of the noise suppressor 18.

(Fourth Embodiment)

Figure 11:
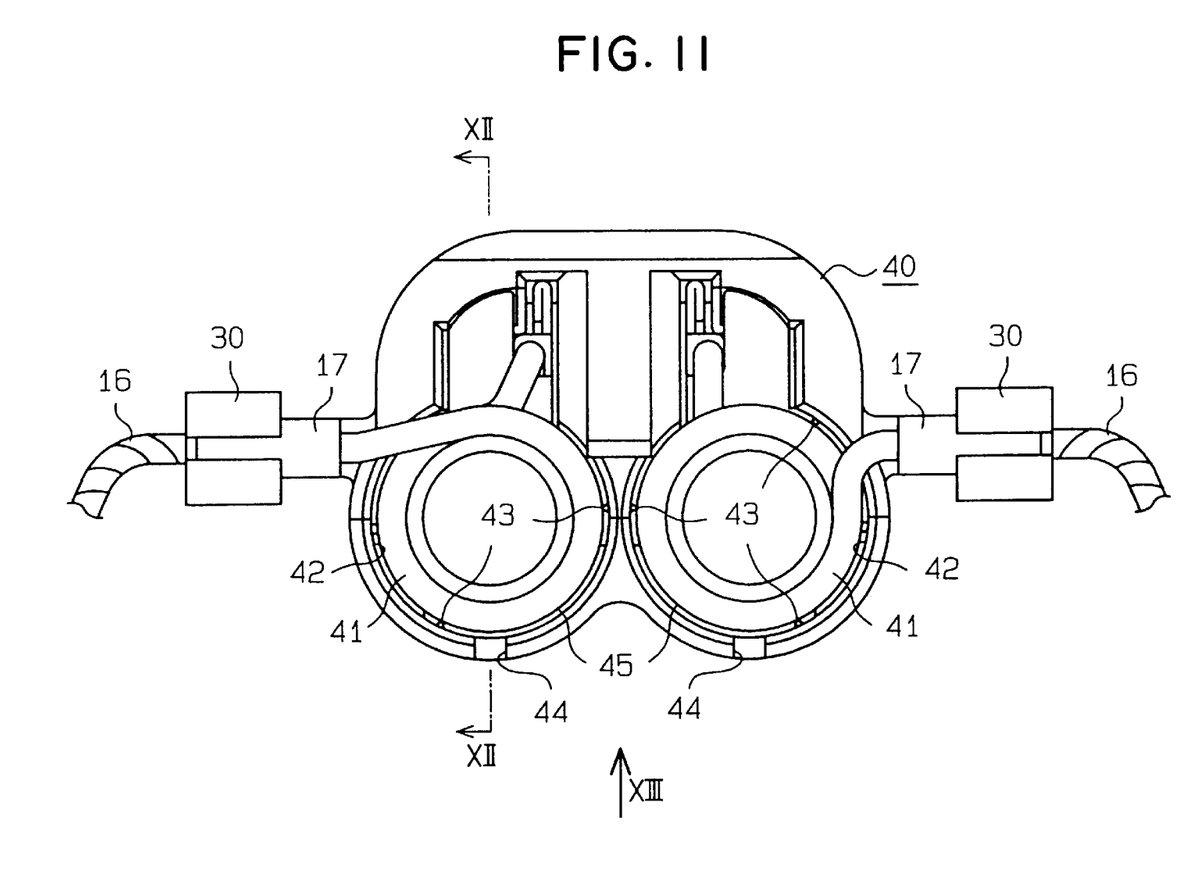
FIG. 11 is a schematic top view showing an electrical noise suppressor according to a fourth preferred embodiment of the present invention.
Figure 12:
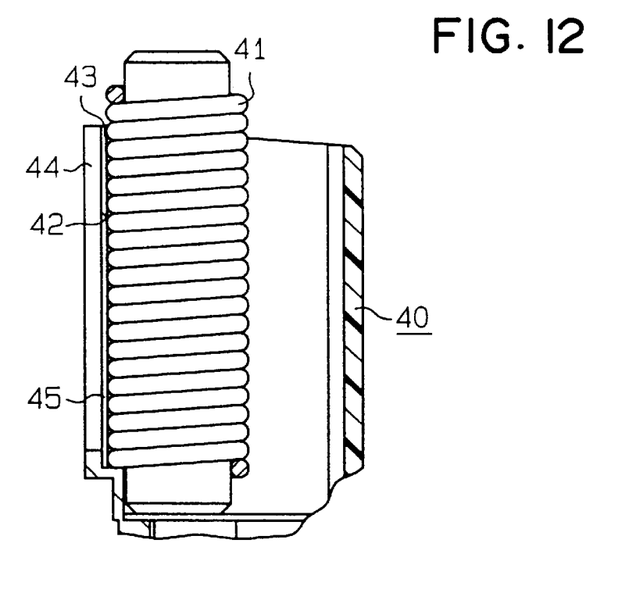
FIG. 12 is a cross-sectional view taken along line XII—XII in FIG. 11.
Figure 13:
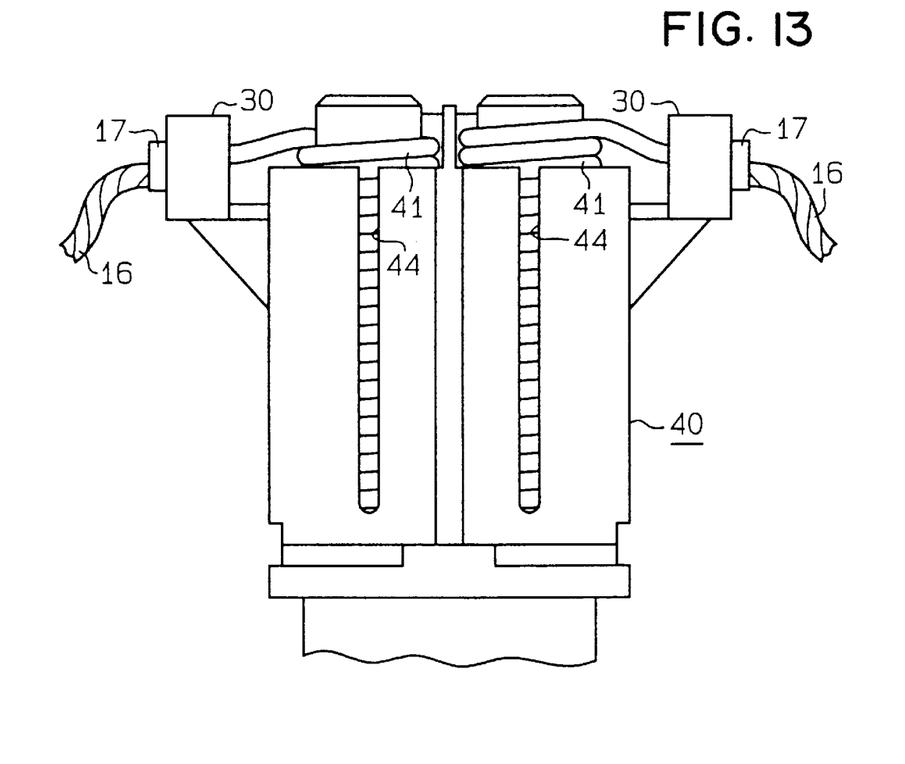
FIG. 13 is a front view taken from arrow XIII in FIG. 11.

A fourth preferred embodiment of the present invention is shown in FIGS. 11–13. In this embodiment, as shown in FIGS. 11, 12, the noise suppressor 18 has a grommet 40 having a choke coil insertion hole 42 for accommodating a choke coil 41. Three ribs 43 extending in an insertion direction of the choke coil 41 (i.e., up-down direction) are formed to protrude from an inner surface of the grommet 40 toward a center axis of the choke coil insertion hole 42. The rib 43 has a triangular cross-section so that a width of the rib 43 in a direction perpendicular to an insertion direction of the choke coil 41 decreases toward the center axis of the choke coil insertion hole 42. The number of the ribs 43 may be more than three.

Further, as shown in FIGS. 11–13, a slit 44 extending in the insertion direction of the choke coil 41 is formed in a wall of the grommet 40. The number of the slit 44 may be more than one.

According to the fourth embodiment, when the choke coil 41 is inserted into the coil insertion hole 42 and an outer diameter tolerance of the choke coil 41 is minimum, an outer surface of the choke coil 41 makes contact with the rib 43, thereby restricting chattering of the choke coil 41 within the choke coil insertion hole 42. On the other hand, when the choke coil 41 is inserted into the coil insertion hole 42 and the outer diameter tolerance of the choke coil 41 is maximum, the rib 43 is crashed, thereby absorbing the outer diameter tolerance of the choke coil 41. Therefore, attachment efficiency of the choke coil 41 is improved even if a dimension of the choke coil 41 varies.

Further, when the choke coil 41 is inserted into the choke coil insertion hole 42, the outer surface of the choke coil 41 makes contact with the rib 43, thereby forming an opening 45 between the choke coil 41 and an inner surface of the grommet 40. As a result, heat generated by the choke coil 41 when the motor 10 is operated or locked is emitted through the opening 45, thereby reducing deformation or weakening of the grommet 40 due to heat.

Furthermore, when the choke coil 41 is inserted into the choke coil insertion hole 42, the slit 44 is widened, thereby facilitating the choke coil 41 to be inserted into the choke coil insertion hole 42. As a result, assembly efficiency of the choke coil 41 is improved even if the dimension of the choke coil 41 varies.

In the above-mentioned embodiments, the choke coil insertion hole 27 may be made of only the large diameter circle 25 or the small diameter circle 26. However, in this case, only one kind of the choke coil 20 can be mounted on the grommet 19.

The present invention is not limited to a noise suppressor for a wiper driving motor, but may be applied to a noise suppressor for any DC motor.

Although the present invention has been fully described in connection with a preferred embodiment thereof with reference to the accompanying drawings, it is to be noted that various changes and modifications will become apparent to those skilled in the art.

Such changes and modifications are to be understood as being within the scope of the present invention as defined by the appended claims.

What is claimed is:

1. An electrical noise suppressor for a direct current motor having a brush connected with a pigtail, said electrical noise suppressor comprising:
   a terminal connected to an external power source for supplying power to said brush;
   a choke coil connected between said brush and said terminal in series;
   a grommet having an accommodating portion for accommodating said choke coil; and
   a pigtail connecting portion connected to said choke coil and connectable with said pigtail, said pigtail connecting portion disposed outside said accommodating portion, wherein:
   said terminal is held by said grommet and is disposed outside said accommodating portion; and
   a pair of supporting portions for supporting said pigtail connecting portion are symmetrically formed at an outer peripheral portion of said accommodating portion.

2. The electrical noise suppressor according to claim 1, wherein:
   a rib is formed to protrude from an inner circumferential surface of said accommodating portion with a uniform height toward a center axis of said accommodating portion, and to extend in an insertion direction of said choke coil in parallel with said center axis.

3. The electrical noise suppressor according to claim 1, wherein:
   said choke coil has a core and a coil portion having a terminal connection end for connecting with said terminal;
   said terminal has a plate and a coil fastening portion for fastening said coil portion;
   said grommet has a holding portion for holding said terminal and a separator for separating said terminal;
   said holding portion includes a supporting stand portion;
   said core is held in contact with said plate;
   said terminal connection end is fastened by said coil fastener; and
   said plate is supported by said supporting stand portion.

4. The electrical noise suppressor according to claim 3, wherein:
   a first end of said core is held in contact with said plate; and
   a second end of said core is secured to said coil portion through bonding so that said core does not come off from said coil portion.

5. An electrical noise suppressor for a direct current motor having a brush connected with a pigtail, said electrical noise suppressor comprising:
   a terminal connected to an external power source for supplying power to said brush;
   a choke coil connected between said brush and said terminal in series;
   a grommet having an accommodating portion for accommodating said choke coil; and
   a pigtail connecting portion connected to said choke coil and connectable with said pigtail, said pigtail connecting portion disposed outside said accommodating portion, wherein:
   said terminal is held by said grommet and is disposed outside said accommodating portion; and
   a supporting portion for supporting said pigtail connecting portion is formed at an outer peripheral portion of said accommodating portion;
   wherein said accommodating portion has a choke coil insertion hole into said choke coil is inserted;
   said choke coil insertion hole is made of a first hole and a second hole which partially lap over with each other; and
   a diameter of said first hole is larger than that of the second hole.

6. The electrical noise suppressor according to claim 5, wherein:
   said choke coil has a core and a coil portion having a terminal connection end for connecting with said terminal;
   said terminal has a plate and a coil fastening portion for fastening said coil portion;
   said grommet has a holding portion for holding said terminal;
   said holding portion includes a supporting stand portion;
   said core is held in contact with said plate;
   said terminal connection end is fastened by said coil fastener; and
   said plate is supported by said supporting stand portion.

7. The electrical noise suppressor according to claim 6, wherein:
   a first end of said core is held in contact with said plate; and
   a second end of said core is secured to said coil portion through bonding so that said core does not come off from said coil portion.

8. An electrical noise suppressor for a direct current motor having a brush connected with a pigtail, said electrical noise suppressor comprising:
   a terminal connected to an external power source for supplying power to said brush;
   a choke coil connected between said brush and said terminal in series;
   a grommet having an accommodating portion for accommodating said choke coil; and
   a pigtail connecting portion connected to said choke coil and connectable with said pigtail, said pigtail connecting portion disposed outside said accommodating portion, wherein:
   said terminal is held by said grommet and is disposed outside said accommodating portion; and
   a supporting portion for supporting said pigtail connecting portion is formed at an outer peripheral portion of said accommodating portion;
   wherein a rib is formed to protrude from an inner circumferential surface of said accommodating portion toward a center axis of said accommodating portion and to extend in an insertion direction of said choke coil; and
   wherein a width of said rib in a direction perpendicular to said insertion direction is decreased toward said center axis so that said rib has a triangular cross-section.

9. An electrical noise suppressor for a direct current motor having a brush connected with a pigtail, said electrical noise suppressor comprising:
   a terminal connected to an external power source for supplying power to said brush;
   a choke coil connected between said brush and said terminal in series;

a grommet having an accommodating portion for accommodating said choke coil; and a pigtail connecting portion connected to said choke coil and connectable with said pigtail, said pigtail connecting portion disposed outside said accommodating portion, wherein:

said terminal is held by said grommet and is disposed outside said accommodating portion;

a supporting portion for supporting said pigtail connecting portion is formed at an outer peripheral portion of said accommodating portion; and wherein a slit is formed in a cylindrical wall of said accommodating portion to extend in an insertion direction of said choke coil.

10. An electrical noise suppressor for a direct current motor having a brush connected with a pigtail, said electrical noise suppressor comprising:

a terminal connected to an external power source for supplying power to said brush;

a choke coil connected between said brush and said terminal in series;

a grommet having an accommodating portion for accommodating said choke coil; and a pigtail connecting portion connected to said choke coil and connectable with said pigtail, said pigtail connecting portion disposed outside said accommodating portion, wherein:

said terminal is held by said grommet and is disposed outside said accommodating portion;

wherein a rib is formed to protrude from an inner circumferential surface of said accommodating portion toward a center axis of said accommodating portion and to extend in an insertion direction of said choke coil;

wherein a width of said rib in a direction perpendicular to said insertion direction is decreased toward said center axis so that said rib has a triangular cross-section.

11. An electrical noise suppressor for a direct current motor having a brush connected with a pigtail, said electrical noise suppressor comprising:

a terminal connected to an external power source for supplying power to said brush;

a choke coil connected between said brush and said terminal in series;

a grommet having an accommodating portion for accommodating said choke coil; and a pigtail connecting portion connected to said choke coil and connectable with said pigtail, said pigtail connecting portion disposed outside said accommodating portion, wherein:

said terminal is held by said grommet and is disposed outside said accommodating portion;

wherein a slit is formed in a cylindrical wall of said accommodating portion to extend in an insertion direction of said choke coil.

12. An electrical noise suppressor for a direct current motor having a brush connected with a pigtail, said electrical noise suppressor comprising:

a terminal connected to an external power source for supplying power to said brush;

a choke coil connected between said brush and said terminal in series;

a grommet having an accommodating portion for accommodating said choke coil; and a pigtail connecting portion connected to said choke coil and connectable with said pigtail, said pigtail connecting portion disposed outside said accommodating portion, wherein:

said terminal is held by said grommet and is disposed outside said accommodating portion;

said accommodating portion has a choke coil insertion hole into which said choke coil is inserted;

said choke coil insertion hole is made of a first hole and a second hole which partially lap over with each other; and a diameter of said first hole is larger than that of said second hole.

13. An electrical noise suppressor for a direct current motor having an armature and a brush making contact with a commutator of said armature, said electrical noise suppressor comprising:

a terminal connected to an external power source;

a choke coil connected between said brush and said terminal in series; and a grommet for accommodating said choke coil and holding said terminal, wherein;

said grommet has an engaging portion disposed at a connection area between said terminal and said choke coil, so that said terminal is disposed outside the motor and said choke coil is disposed inside the motor.

14. An electrical noise suppressor for a direct current motor having an armature and a brush making contact with a commutator of said armature, said electrical noise suppressor comprising:

a terminal connected to an external power source;

a choke coil connected between said brush and said terminal in series; and a grommet for accommodating said choke coil and holding said terminal, wherein;

said grommet has an engaging portion disposed at a connection area between said terminal and said choke coil;

wherein said grommet has a choke coil insertion hole into which said choke coil is inserted;

said terminal has a connection terminal portion;

said engaging portion includes a supporting stand portion for supporting said terminal, disposed at a bottom of said choke coil insertion hole, and a positioning portion for positioning said terminal, disposed between said supporting stand portion and said connection terminal portion; and a thickness of said positioning portion in a direction perpendicular to an insertion direction of said choke coil gradually increases so that said positioning portion is held in contact with said connection terminal portion.

* * * * *

UNITED STATES PATENT AND TRADEMARK OFFICE
CERTIFICATE OF CORRECTION

PATENT NO.   : 6,104,110
DATED        : August 15, 2000
INVENTOR(S)  : Yoshihiko Harada, Yasushi Sugahara, Yasuaki Uchida and Tsugio Ozaki It is certified that error appears in the above-identified patent and that said Letters Patent is hereby corrected as shown below:

<u>Title page,</u>
Item [73], Assignee, correct the Assignee to read -- ASMO Co., Ltd, Kosai-city, Japan --.

Signed and Sealed this

Twenty-fifth Day of June, 2002

Attest:

JAMES E. ROGAN
Attesting Officer        Director of the United States Patent and Trademark Office